United States Patent [19]

Misawa et al.

[11] Patent Number: 5,444,482
[45] Date of Patent: Aug. 22, 1995

[54] DIGITAL ELECTRONIC CAMERA FOR SELECTIVELY RECORDING A FRAME OF STILL IMAGE AND MOVIE FIELDS OF IMAGE IN A RECORDING MEDIUM

[75] Inventors: Takeshi Misawa; Takeshi Ohta, both of Asaka, Japan

[73] Assignee: Fuji Photo Film Co., Ltd., Kanagawa, Japan

[21] Appl. No.: 233,957

[22] Filed: Apr. 28, 1994

[30] Foreign Application Priority Data

Apr. 28, 1993 [JP] Japan ................. 5-102146

[51] Int. Cl.⁶ ................................ H04N 5/335
[52] U.S. Cl. ............................ 348/220; 348/231; 358/335
[58] Field of Search .......... 348/207, 220, 294, 317, 348/231, 208, 320, 230; 358/335, 906; H04N 5/225, 5/335; 382/56

[56] References Cited

U.S. PATENT DOCUMENTS

| | | | |
|---|---|---|---|
| 4,546,390 | 10/1985 | Konishi et al. | 348/220 |
| 4,750,041 | 6/1988 | Vogel et al. | 348/220 |
| 4,758,883 | 7/1988 | Kawahara et al. | 358/335 |
| 5,067,029 | 11/1991 | Takahashi | 358/335 |
| 5,309,247 | 5/1994 | Kinoshita et al. | 358/335 |

Primary Examiner—Joseph Mancuso
Assistant Examiner—Tuan V. Ho

[57] ABSTRACT

A manipulation of the shutter release button mechanism causes the first signal to be detected by the control processor, which selects in turn the still picture mode effecting still picture recording on a data recording medium. A further manipulation of the release button mechanism causes the second signal to be detected by the control processor, which selects in turn the movie picture mode effecting movie picture recording on the data recording medium. In the still picture mode, pixel signals generated by the image sensor are transferred on the frame basis, while in the movie picture mode, pixel signals are transferred on the interlaced field transfer basis. The pixel signals are converted into corresponding digital image data to be stored in the frame memory, from which the control processor read the stored image data. In the still picture mode, a frame of image data is sequentially read out from the memory and compressed as a still image to be recorded on the oprical disk. In the movie picture mode, part of a frame of image data is read out from the memory with any movement of the camera compensated for on the basis of signals obtained from the movement sensor and compressed as movie images to be recorded on the same optical disk.

10 Claims, 4 Drawing Sheets

DIGITAL ELECTRONIC CAMERA FOR SELECTIVELY RECORDING A FRAME OF STILL IMAGE AND MOVIE FIELDS OF IMAGE IN A RECORDING MEDIUM

BACKGROUND OF THE INVENTION

1. Field of the Invention

The present invention relates to a digital electronic camera for photographing the image of an object, and more particularly to a digital electronic camera for capturing the image of an object and recording data representative of still and movie images in a single data recording medium.

2. Description of the Related Art

Recently, there are known imaging appliances, such as electronic still cameras capturing objective fields and storing image data representing still images of the fields in an integrated-circuit card memory device, and video camera-tape recorders adapted for capturing movie images of objective fields and recording on a magnetic tape or video tape video signals representing the movie images captured.

The integrated-circuit card memory for use with electronic still cameras has the storage capacity of several megabytes to several-ten megabytes, for example. The limited storage capacity of the card memories forces image data to be compressed by means of still image compression scheme in order-to efficiently utilize the limited storage capacity. In addition, magnetic tapes for use in video movie systems have image signals, representative of movie pictures, recorded in the form of frequency modulated signals. The image data or signals recorded in an image signal storage medium, such as integrated-circuit card memory or magnetic tape, are reproduced by a playback device exclusively adapted for the type of storage medium to be visualized on an image monitor such as a TV monitor device in the form of pictures of the object.

Under those circumstances, there are demands for capturing still and movie images of objects and recording them on a single storage medium. A mere assembling conventional video appliances to attain the capturing and recording of still and movie images in a single storage medium would increase the mass of, and harm the portability and operability of, the resultant assembly, resulting in increase of the cost of the assembly. The recording image data captured in a single storage medium makes it difficult to select a desired image quality suitable for recording both still and movie images of an object.

SUMMARY OF THE INVENTION

It is therefore an object of the present invention to provide a digital electronic camera improved in operability and capable of capturing an objective field and storing image data representative of both still and movie images of the objective field in a single storage medium.

In accordance with the present invention, a manipulation of the shutter release button mechanism causes the first signal to be detected by the control processor, which will in turn select the still picture mode effecting still picture recording on a data recording medium. A further manipulation of the release button mechanism causes the second signal to be detected by the control processor, which will in turn select the movie picture mode effecting movie picture recording on the data recording medium. In the still picture mode, pixel signals generated by the image sensor are transferred on the frame basis, while in the movie picture mode, pixel signals are transferred on the interlaced field transfer basis. The pixel signals are converted into corresponding digital image data to be stored in the frame memory, from which the control processor read the stored image data. In the still picture mode, a frame of image data is sequentially read out from the memory and compressed as a still image to be recorded on the oprical disk. In the movie picture mode, part of a frame of image data is read out from the memory with any movement of the camera proper compensated for on the basis of signals obtained from the movement sensor and compressed as movie images to be recorded on the same optical disk.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
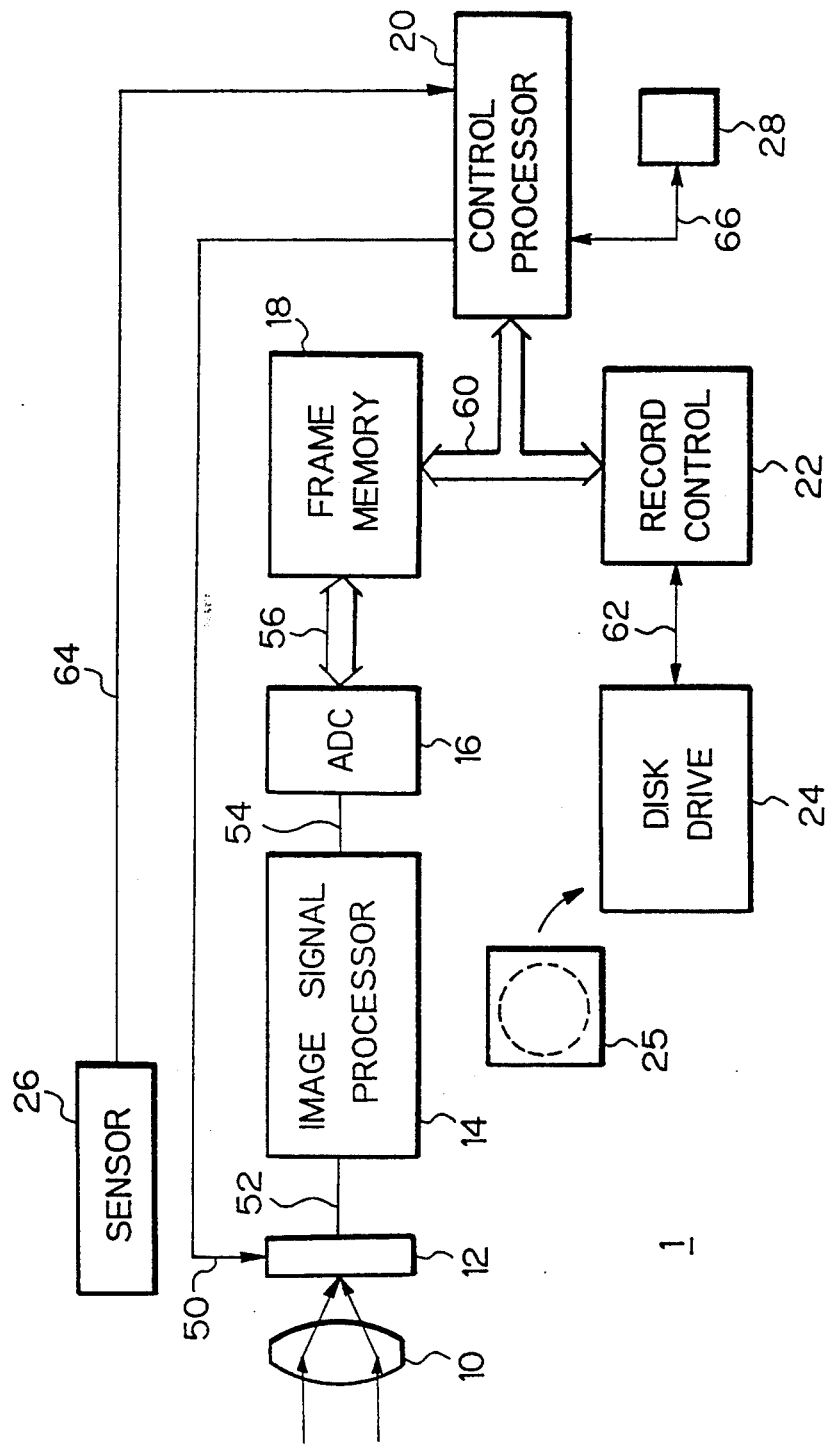
FIG. 1 is a schematic block diagram showing a preferred embodiment of a digital electronic camera according to the present invention.

With reference to FIG. 1 of the accompanying drawings, a preferred embodiment of a digital electronic camera 1 in accordance with the present invention is apparatus for transducing an optical image of an object, not shown, formed by an optical lens 10 on an image sensor 12 into pixel signals representative of the optical image, processing the pixel signals in the form of digital image data, and recording the resultant image data on an optical disk 25 set in a disk drive 24. Particularly, digital camera 1 is adapted to be operative in response to a manipulation of an operator to selectively record in optical disk 25 image data representing a still image of an object and consecutive images of the object in the form of movie pictures. In the following, portions of the digital camera not directly relevant to understanding of the invention are not shown and omitted from description due to mere simplicity. In the figures, signals are designated by the reference numerals designating connections on which the corresponding signals appear.

More specifically, digital electronic camera 1 comprises optical lens 10 forming the optical image of an object to be shot, image sensor 12 for producing pixel signals associated with the optical image thus formed, and an image signal processor 14 adapted for processing the pixel signals produced to develop image signals representative of the optical image captured. Digital camera 1 includes an analog-to-digital conventer (ADC) 16 for Converting the output from image signal processor 14 into image data containing corresponding digital values, a frame memory 18 for temporarily storing therein the image data, and control processor 20 adapted to compress the image data stored in frame memory 18 for the purpose of recording in optical disk 25 and also to control the overall operations of digital camera 1. Digital camera 1 further comprises record control 22 for controlling the recording of the thus compressed image data in optical disk 25, and disk drive 24, in which optical disk 25 is detachably mounted, for writing the image data developed from record control 22 on optical disk 25. Digital camera 1 is further equipped with a sensor 26 for sensing movement or viblation of camera 1, and a shutter release button mechanism 28 oprative in response to a manipulation of the operator for informing control processor 20 of when the operator intends to capture the image of an object and record the image data.

Image sensor 12 has an array of photosensitive cells and is adapted to transduce the optical image of an object formed on the photosensitive array into corresponding pixel signals. Image sensor 12 is, for example, comprised of a solid-state photosensitive device, such as charge-coupled device (CCD). The array of photosensitive cells may be covered with a color filter which separates the incident lights into the three primary colors, R, G and B, for example. Image sensor 12 is responsive to drive signals supplied to its input 50 from control processor 20 to drive the photosensitive array, which in turn produces electric charges associated with the optical image fromed in the frame read-out or field read-out fashion. The electric charges are developped on its output 52 in the form of pixel signals. Output 52 is interconnected to image signal processor 14.

Figure 4A:
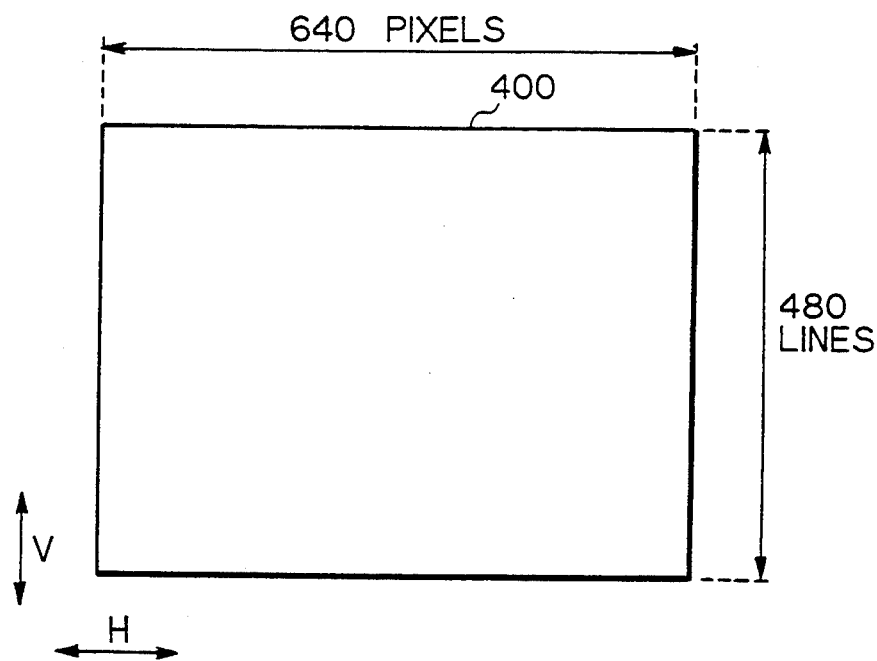
FIGS. 4A and 4B show examples of the imaging field established by the illustrative embodiment.

As shown in FIG. 4A, the photosensitive array of image sensor 12 has an imaging field 400 including 640 photosensitive cells or pixels in its horizontal direction H to form a horizontal line and 480 lines in its vertical direction (V), thus including approximately three hundred thousand photosensitive cells or pixels. The array of photosensitive cells in imaging field 400 is driven by the drive signals supplied from control processor 20 to produce pixel signals from the respective cells.

Image signal processor 14 accomplishes image processings onto the pixel signals developed from image sensor 12 to produce suitable image signals. For example, image signal processor 14 amplifies and processes the pixel signals received on its input 52 to correct the gamma characteristics and clamp the black level to the reference level, forming image signals suitable for reproduction. Signal processor 16 delivers the produce image signals to the analog-to-digital conventer 16 connected to its output 54.

Analog-to-digital converter 16 converts the analog image signals to corresponding digital signals including digital values. More specifically, converter 16 samples the image signals fed to its input 54 at the predetermined intervals and quantizes the samples. The resultant quantized values are in turn encoded into corresponding digital data including 8 to 10 bits, for example. Converter 16 develops the resultant image data from its output 56 to frame memory 18 on a bit parallel basis.

Frame memory 18 stores therein the bits of image data. The bits of image data received on input 56 of frame memory 18 are stored in memory 18 on a image frame-by-frame basis. The frame of image data can be developed from frame memory 18 on a frame basis. Frame memory 18 is operative in response to the read-out control signals provided from control processor 20, described later, to produce the image data stored from its output 60. Output 60 is interconnected to control processor 20 by a bus 60 on one hand, and separately to record control 22 on the other hand.

Control processor 20 reads out the image data stored in frame memory 18 and adapts the readout data to the form of data suitable to recording in optical disk 25. In addition, control processor 20 controls the overall operations of the circuity of digital camera 1. More specifically, control processor 20 compresses the image data read out from frame memory 18 and appearing on bus 60, and provides record control 22 with the resultant, compressed image data via bus 60. In addition, control processor 20 also controls image sensor 12, frame memory 18 and record control 22 in response to a movement of the camera proper sensed by sensor 26 and/or manipulations of the operator notified by shutter release button mechanism 28. Further ditails will be described later.

Record control 22 controls disk drive 24 in order to record the image data processed by control processor 20 in optical disk 25. Record control 22 generates, under the control of control processor 20, drive signals driving disk drive 24. Additionally, record control 22 modulates the image data, adapted for recording and provided from control processor 20 over bus 60, by means of the so-called eight-to-fourteen modulation (EFM) with error correction control added thereto to produce recording data. Record control 22 provides disk drive 24 with the thus generated drive signals and recording data from its output 62.

Disk drive 24, on which optical disk 25 is detachably mounted, is responsive to drive signals provided from record control 22 to write the image data received by its input 62 onto optical disk 25. More specifically, disk drive 24 includes a combination of an optical transducer and a magnetic recording transducer, not shown, which are adapted to write image data produced by drive control 22 on optical disk 25. Disk drive 24 also includes a drive mechanism for driving optical disk 25 in rotation of the constant linear velosity fashion with reference to the radial position of the optical transducer on disk 25. Optical disk 25 mounted on disk drive 24 may advantageously in the preferred embodiment be a rewritable data recording medium. Such as a mini-disk, ramdomly accessible at higher access rate. The mini-disk is a sort of optical magnetic recording medium having a recording area formed on which data is rewritably recorded. The rewritable recording area has a guide groove cut on its surface for use in tracking by the optical transducer, along which groove data tracks are formed. Sensing of the groove allows the optical transducer to seek tracks in the radial direction, thereby establishing data searching on a random access basis. Disk drive 24 supplies the magnetic transducer with a drive current associated with write data received by its input 62. The optical transducer is also adapted to illuminate the tracks on optical disk 25 with a laser beam responsive to the data read-out and write-in modes. The optical transducer also functions as sensing part of the laser beam reflected from the tracks on optical disk 25 to produce electric signals associated with the sensed light to record control 22.

Sensor 26 serves to sense how digital camera 1 physically moves and produce corresponding electric signals over a connection 64. The electric signals represent an unintentional movement or vibration of the camera body proper which would cause blur in a picture reproduced. Sensor 26 may advantageously include a piezoelectric gyroscopic transducer, which is mounted on a circuit board of digital camera 1 and adapted to sense any mechanical movement thereof. Sensor 26 also includes an oscillator for generating pulse signals which are in turn supplied to the gyroscopic transducer to mechanically vibrate the latter, as well as an amplifier for amplifying the signal components responsively sensed to changes in vibration by transducer. Sensor 26 provides control processor 20 with the sensed signals representing the unintentional movement of the camera proper.

Figure 2:
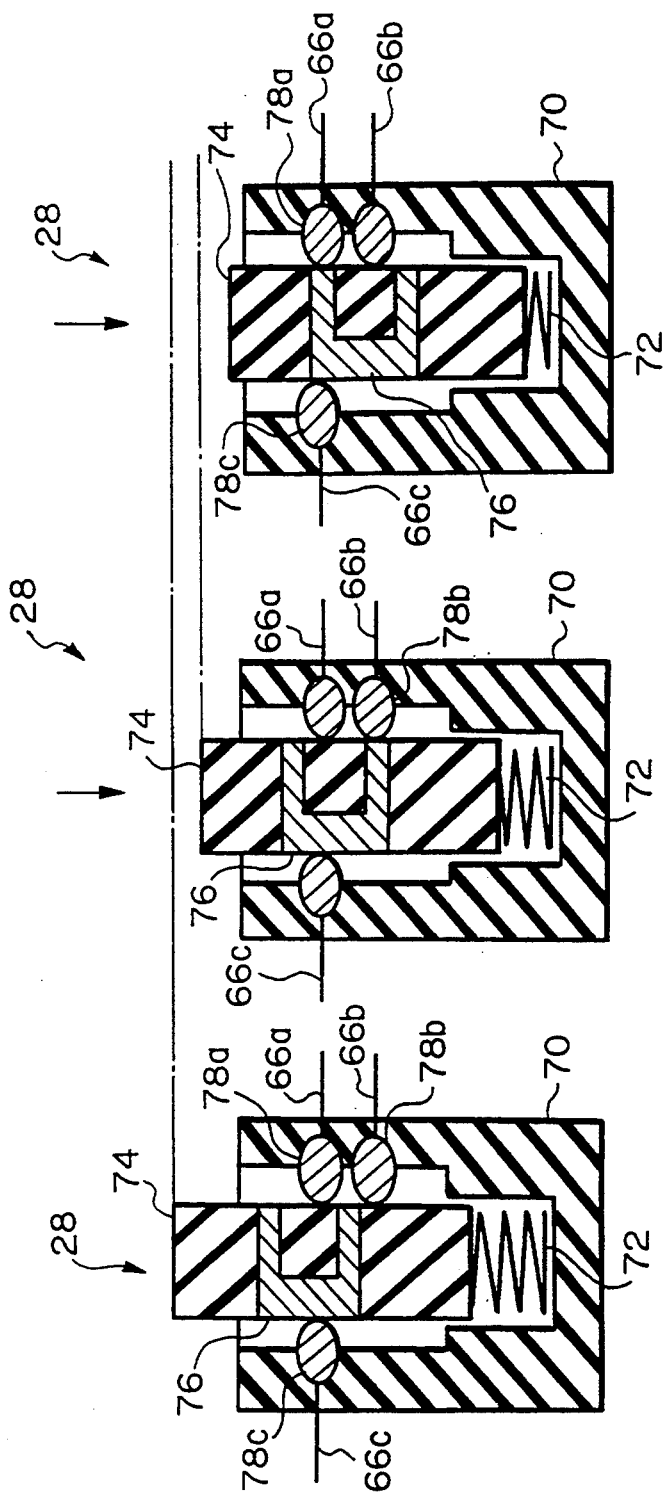
FIGS. 2A, 2B and 2C show the cross sections in operation of the shutter release button mechanism included in the camera shown in FIG. 1.

Shutter release button mechanism 28 functions as being responsive to a shutter release button 74. FIG. 2, and informing control processor 20 of when release button 74 is depressed to allow the image data captured to be recorded on optical disk 25. Shutter release button mechanism 28 includes a switch circuit for producing an ON and OFF signal responsive to whether or not button 74 is depressed. More specifically with reference to FIGS. 2A, 2B and 2C, exemplarily showing the cross sections of release button mechanism 28, the latter comprises a support 70 made of non-electric conductive material, which has a central recess formed which receives a spring 72 on its bottom. Spring 72 supports thereon a column-like button member 74, which is movable in its longitudinal direction in the recess. As seen in FIG. 2A, for example, release button 74 is made of non-conductive material and has its middle portion 76 formed, approximately in the middle of column 74, of electrically conductive material. Middle portion 76 is referred to as a common conductive member. In the figures, the left portion of button member 74 has part of common conductive member 76 extending in the longitudinal direction of button member 74 with a certain width, and the uppermost and lowermost parts of common conductive member 76 are elongated towards the right portion, in the figure, of the cylindrical surface of button member 74, as seen in the figures. In the inner cylindrical surface of the recess of support member 70, contact members 78a and 78b are disposed which are made of electro-conductive material, such as rubber with particles of electro-conductive substance dispersed therein, so as to be brought into contact, as button member 74 is being depressed, with common conductive member 76. Also in the part of the inner cylindrical surface of the recess which is opposite to contacts 78a and 78b, there is provided another contact 78c which is always made in electrical contact with the longitudinally extending porion of common conductive member 76, as shown in FIG. 2A. Contacts 78a, 78b and 78c are coupled to electrical connections 66a, 66b and 66c, respectively, which are connected to control processor 20, FIG. 1.

Common conductive member 76 is, under the normal condition, enabled by spring 72 to the position such that it is not get in contact with contacts 78a and 78b, as shown in FIG. 2A. When shutter button member 74 is depressed downward to press spring 72 to the position shown in FIG. 2B, common conductive member 76 is brought into contact with contact 78b to electrically connect connections 66b and 66c. When shutter button member 74 is further depressed downward to the position shown in FIG. 2C, common conductive member 76 is made in contact with contact 78a to electrically connect connections 66a and 66c while conductive member 76 leaves contact 78b to disconnect connection 66b from connections 66c. Hereinafter, the situation when conductive member 76 is connected with contact 78b is referred to as the first ON connection and the signal conveyed then is as the first signal. Also the situation when conductive member 76 is connected with contact 78a is referred to as the second ON connection and the signal conveyed then is as the second signal. Shutter button mechanism 28 is thus adapted to convey the first and second signals over connection 66 to control processor 20, FIG. 1. The switching mechanism may be comprised of make and break switches.

Figure 3:
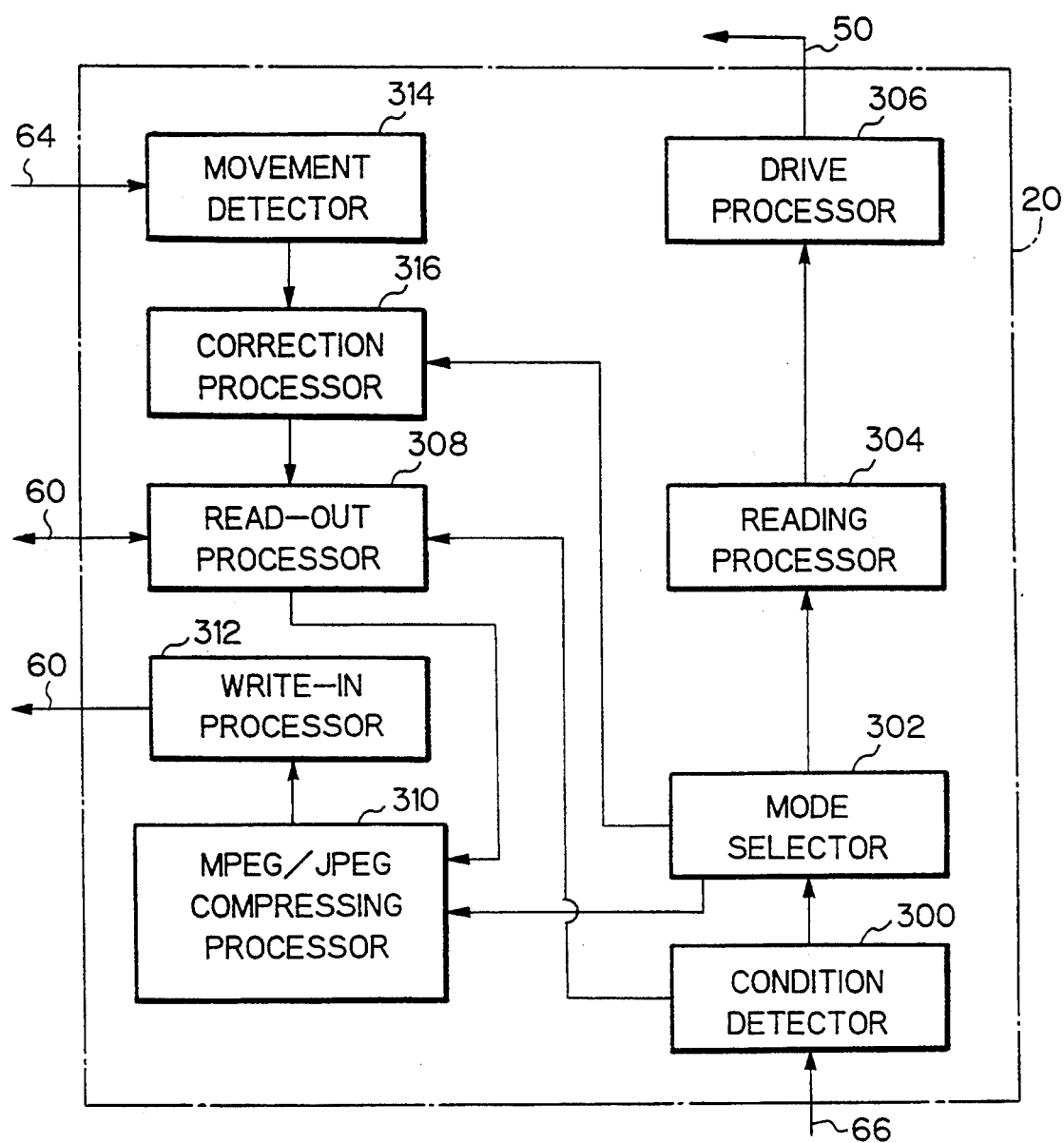
FIG. 3 is a schematic block diagram showing the functional elements of the control processor shown in FIG. 1.

Now with reference to a schematic block diagram shown in FIG. 3, control processor 20 will be described in detail. As shown in the figure, control processor 20 includes a condition detector 300, a mode selector 302, a reading processor 304, a drive processor 306, a read-out processor 308, a data compressing processor 310, a write-in processor 312, a movement detector 314 and a correction processor 316.

Condition detector 300 functions as being operative in response to the first and second signals obtained from shutter button mechanism 28 to determine the first and the second ON connections. Condition detector 300 is adapted to deliver the first and second condition signals representing the start and end of the first and second ON connections thus determined, respectively, to mode selector 302 and read-out processor 308.

Mode selector 302 is responsive to the condition signals delivered from condition detector 300 to select the operative modes of disk camera 1. More specifically, mode selector 302 selects, when having received the first condition signal, the still picture mode in which a still image is recorded on optical disk 25, and informs reading processor 304, data compressing processor 310 and correction processor 316 of the still picture mode, thus the still picture mode being set in digital camera 1. Mode selector 302 selects, when having received the second condition signal, the movie picture mode in which movie images are recorded on optical disk 25, and informs reading processor 304 and correction processor 316 of the movie picture mode, thus the movie picture mode being set in digital camera 1.

Reading processor 304 is responsive to the operative mode informed from mode selector 302 to set a reading scheme, as to how the electric charges generated in image sensor 12 are read out. When reading processor 304 is informed from mode selector 302 of the still picture mode, then it causes drive processor 306 to set the frame transfer mode in image sensor 12. When reading processor 304 is informed from mode selector 302 of the movie picture mode, then it causes drive processor 306 to set the field transfer mode in image sensor 12.

Drive processor 306 drives image sensor 12 pursuant to the reading scheme set by reading processor 304. Drive processor 306 generates, when the frame transfer mode is set by reading processor 304, a drive signal causing the frame of electric charges to be transferred from the photosensitive array 400, FIG. 4A, of image sensor 12. When the field transfer mode is set by reading processor 304, drive processor 306 generates, another drive signal causing the fields of electric charges to be transferred from the photosensitive array 400 of image sensor 12 in the interlacing fashion. The latter drive signal is generated by drive processor 306 at longer intervals between image frames so as to allow the photosensitive array 400 of image sensor 12 to be sufficiently exposed with imagewise light. This intends to increase the virtual sensitivity of the photosensitive array 400. The drive signals are developed from output 50 of drive processor 306.

Figure 4B:
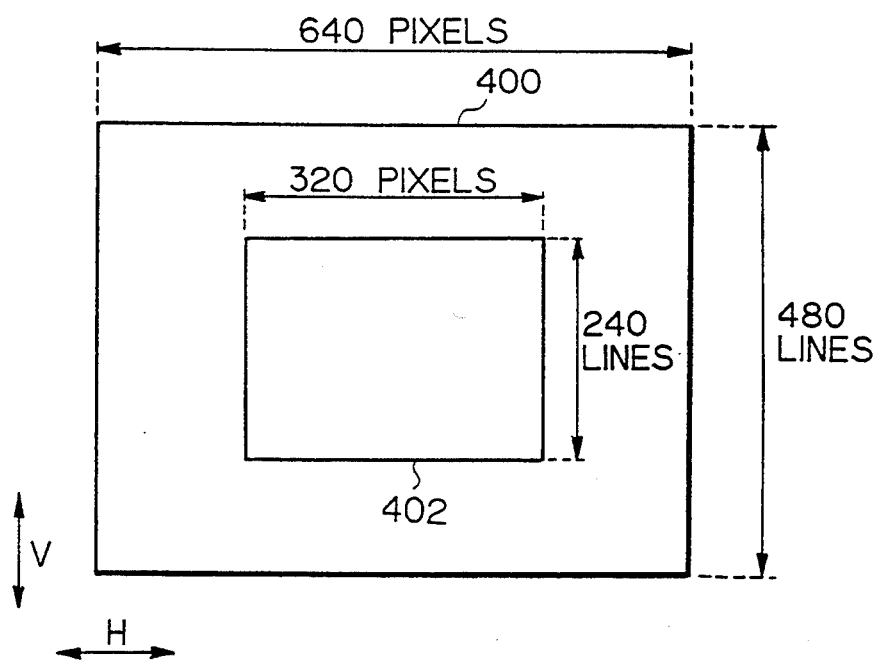

Read-out processor 308 is adapted to read out the image data stored in frame memory 18 in response to the condition signals provided from condition detector 300. For example, when read-out processor 308 is informed of the first condition signal from condition detector 300, it reads out a frame of image data sequentially from frame memory 18 forming an image frame 400, FIG. 4A. In other words, the image data corresponding to the entire area of the imaging field 400, FIG. 4A, is read out from frame memory 18. When read-out processor 308 is informed of the second condition signal from condition detector 300, it reads out part of the image data stored in frame memory 18. More specifically, the part of image data corresponding to a unit area, e.g. 402 in image frame 400, FIG. 4B, is read out from frame memory 18. In the instant example, rectangular area 402 includes 320 pixels in its horizontal direction and 240 lines in its vertical direction. Read-out processor 308 reads out a corresponding plurality of units of image data to the period in which it is informed of the second condition signal.

Area 402 may be modified in accordance with the situations in which digital camera 1 is used, for example. This permits the size of the visualized image frame to continuously be changed during imaging operation by reading out the image data corresponding to the changeable size of area 402, or the visualized image frame, from frame memory 18. In this case, the image data thus read out changeably in size may be used by a playback device with a certain processing such as interpolation effected to accomplish zooming effect, for example.

Read-out processor 308 is also adapted to compensate for blur which would otherwise be caused by unintentional movement of camera 1 which may be included in the image data stored in frame memory 18. Read-out processor 308 responds to correction data provided from correction processor 316 to alter accordingly the position at which the image data is read out. In the instant embodiment, read-out processor 308 is provided with a correction signal from correction processor 316 during the period in which it receives the second condition signal from condition sensor 300. Read-out processor 308 changes in response to the correction signal the position of area 402 within imaging field 400, and generates the address representing the altered position of area 402. Image data corresponding to the altered area will be read out from frame memory 18 in response to the new address. The image data read out from frame memory 18 is in turn transferred to data compressing processor 310 under the control of read-out processor 308.

Data compressing processor 310 is adapted to compress the image data transferred from read-out processor 308, Data compressing processor 310 selects the compressing scheme on the basis of the still and movie picture modes selected by mode selector 302, and compresses the image data in accordance with the selected compressing scheme. With the preferred embodiment illustrated, compressing processor 310 includes two compressing functions or circuits, not shown, including still picture and movie picture compression processings. To the instant embodiment, advantageously applicable are the JPEG (Joint Photograph Coding Experts Group) system as the still picture compressing process and the MPEG (Moving Picture Coding Experts Group) system as the movie picture compressing process. The resultant compressed image data will be transferred to write-in processor 312.

Write-in processor 312 performs processings on the image data compressed by data compressing processor 312. Write-in processor 312 converts the image data to the predetermined format applicable to optical disk 25, and generates a write-in signal causing the converted image data to be recorded on optical disk 25 to deliver the signal to record control 22. The resultant, converted image data will in turn be conveyed from output 60 of write-in processor 312 over bus 60 to record control 22.

Movement detector 314 receives a movement signal from sensor 26 on connection 64 and generates movement data representing how digital camera moves or vibrates to cause blur to be involved in a picture. The movement data includes moving amount data representing an angular velocity at which digital camera 1 rotates, and directional data representing the direction in which camera 1 moves by the hirizontal and vertical components. The movement data thus generated is delivered to correction processor 316.

Correction processor 316 is responsive to the movement data provided by movement detector 314 to form correction data used for compensating for blur due to the movement of camera 1 in movie pictures taken by camera 1. Correction data includes correction values by which area 402 is to be shifted in position and which is calculated on the basis of the moving amount and directional data included in the movement data. While the movie mode is selected by mode selector 302, correction processor 316 supplies read-out processor 308 with the correction data thus calculated.

In operation, lens 10 is directed to an object to be imaged to allow the image of the object is formed on photosensitive array 400 of image sensor 12. Shutter button mechanism 28 is then manipulated. As button member 74 is depressed, electrical contact 78b of shutter button mechanism 28 is first brought into contact with common conductive member 76, thus conducting connections 66b and 66c to generate the first signal to condition detector 300 of control processor 20. Condition detector 300 recognizes by the first signal the status of button member 74 to generate the first condition signal to mode selector 302 and reading prpcesspr 304.

Mode selector 302 selects the still picture mode and informs reading processor 304, data compressing processor 310 and correction processor 316 of the still picture mode on the basis of the first condition signal to set the still picture mode. Reading processor 304 sets the frame transfer mode of pixel signals of image sensor 12 to drive processor 306 accordingly. The latter 306 produces drive signals on output 50 which permit image sensor 12 to accomplish the frame transfer. Image sensor 12 responds to the drive signals and develops sequentially pixel signals representative of an image of the object in a frame transfer fashion on output 52 to image signal processor 14.

The pixel signals, received by image signal processor 14, are amplified, and made the processings such as color correction, gamma correction and clamping to be developed from output 54. The image signals 54 are then converted into corresponding digital data by analog-to-digital converter 16, the latter data being temporarily stored in frame memory 18.

A frame of image data stored in frame memory 18 is read out udder the control of read-out processor 308 of control processor 20. Read-out processor 308 has been supplied from condition detector 300 with the first condition signal so that the entire pixel data included in imaging field 400 is sequentially read out from frame memory 18 to data compressing processor 310. In that case, the image data thus read out is subject to the still picture compression processings by compressing processor 310 in response to the still picture mode set by mode selector 302. The resultant, compressed image data will then be transferred to write-in processor 312. Write-in processor 312 converts the input image data to the predetermined format applicable to optical disk 25. Record control 22 is supplied with the write-in signal and thereafter the converted image data over output 60 from write-in processor 308.

Record control 22 produces drive signals response to the write-in signal, and also modulates the image data received by the eight-to-fourteen modulation to develop the modulated image data from its output 62 to disk drive 24. The image data is then fed to the magnetic transducer of disk drive 24 to drive the latter, thereby generating the corresponding magnetic fields onto the recording surface of optical disk 25. The optical transducer of disk drive 24 produces a laser beam onto the opposite surface of optical disk 25, thereby accomplishing the image data recording.

Shutter release button member 74 will further be depressed so as for contact 78a to be made in contact with common conductive member 76, causing connections 66a and 66c to be connected to each other. The second signal is then produced to condition detector 300. Condition detector 300 produces the second condition signal to mode selector 302 and read-out processor 308. In response, mode selector 302 selects the movie picture mode and set it to reading processor 304, data compressing processor 310 and correction processor 316. Reading processor 304 sets drive processor 306 to the field transfer mode. Drive processor 304 produces on output 50 therefrom drive signals allowing image sensor 12 to produce pixel signals in the interlaced field transfer fashion. The pixel signals are then developed from the photosensitive array of image sensor 12 in a field transfer mode on output port 52 to image signal processor 14.

The pixel signals, received by image signal processor 14, are amplified and processed by processor 14, and then converted into corresponding digital data by analog-to-digital converter 16, to be temporarily stored in frame memory 18 in sequence. The image data stored in frame memory 18 is read out under the control of read-out processor 308, which has been supplied from condition detector 300 with the second condition signal so that the pixel data associated with area 402 included in imaging field 400, FIG. 4B, is read out from frame memory 18.

Sensor 26 senses a movement of digital camera 1 to produce the movement signal to movement detector 314. Movement detector 314 then generates movement data to correction processor 316. Correction processor 316 is, while set to the movie picture mode, responsive to the movement data to establish correction data, which will in tun be transferred to read-out processor 308.

Read-out processor 308, having received the second condition signal, corrects the position of area 402 with respect to imaging field 400. The image data involved in area 402, with its position modified, is then read out from frame memory 18. Following the completion of reading out the image data of area 402, read-out processor 308 continues to read out the renewed, corresponding image data involved in area 402 consecutively from frame memory 18 with the position of area 402 corrected in response to the correction data during the period while it receives the second condition signals, thus the image data corresponding to a plurality of areas 402 being consecutively read out from frame memory in the movie picture fashion.

The image data read out by read-out processor 308 is supplied to data compressing processor 310, which has been set to the movie picture mode. Compressing processor 310 accomplishes the movie data compression on the input image data in response to the movie picture mode. The resultant, compressed data is sequentially delivered to write-in processor 312, which in turn converts the data into the predetermined recording format. Write-in processor 312 produces the write-in signal on output port 60 to record control 22. A sequence of the image data, corresponding to a plurality of movie image frames to be visualized, is thus transferred to record control 22.

Record control 22 produces drive signals in response to the write-in signal, and also modulates the image data received by means of the eight-to-fourteen modulation to develop the modulated image data from its output 62 to disk drive 24. The image data is then fed to the magnetic transducer of disk drive 24 to drive the latter, thereby accomplishing the image data recording in the same manner as described earlier in respect of the still image recording.

Upon shutter release button member 74 being released from its depressed position to restore its normal position shown in FIG. 2a, and also the image data recording and all required processings associated therewith being completed, control processor 20 shifts its status to waiting for a following input from shutter release button mechanism 28. In the course of releasing shutter button member 74 to its home position, the first signal is once sensed by condition detector 300 of control processor 20. The first signal thus sensed may be neglected by condition detector 300 as an ineffective signal.

In summary, the illustrative embodiment images an object to selectively record the images in 25. the still and movie picture modes in optical disk In order to record image data in the still mode, a full frame of image data is read out from frame memory 18 and processed whereas, in order to-record image data in the movie picture mode, part of image data corresponding to area 402 within imaging field 400 is read out from frame memory 18 to be processed. Area 402 is smaller than the entire frame of imaging field 400, thus utilizing portions of the image data associated with a peripheral portion adjacent to and surrounding area 402 for the purpose of compensating for blur which would othrewise be caused in a reproduced picture by unintentional movements of digital camera 1 proper. Image data coming from the smaller area used for the movie picture reproduction than the whole area of an image frame will reduce the period of time required for compressing the image data with part of the remaining data contained in the portions surrounding area 402 also effectively utilized. In addition, the smaller amount of the image data of area 402 than the entire frame 400 of image data is used for reproducing movie pictures so as to allow image sensor 12 to be exposed in the period of time sufficient to expose the photosensitive cells with imagewise light to produce an effective level of pixel signals. That allows motion pictures to be reproduced without flickers by means of the so-called frame afterimage effect, causing natural movie pictures to be reproduced. That could also permit a sufficient exposure period of time to be given to image sensor 12 so as to enhance the photosensitivity thereof.

With the preferred embodiment described above, a high-speed accessible data recording medium such as a mini-disk is applicable, and the shutter release button mechanism is employed as shown and described with reference to FIGS. 2A, 2B and 2C. This follows that easy and rapid switching between the still and movie picture modes is accomplished. Moreover, in either of the imaging modes, one can loose an appropriate timing at which he or she intends to capture objective images to achieve easy recording of desired images.

With the illustrative embodiment described above, drive processor 306 generates, in the field transfer mode, the drive signal which elongates the exposure period of time assigned to one frame of image with time intervals between frames increased, thereby achieving natural reproduction of pictures caused by the frame afterimage effect together with increase in sensitivity of the image sensor. The invention is not restricted only to that method, but may be applicable to the type of motion picture recording in which the pixel signals are transferred from the image sensor at the same shutter speed, or pixel signal transfer rate, as the still image recording. Even in that case, each of the motion picture frames can be recorded without being accompanied by blur which would otherwise be caused by unintentional movements of the digital camera as in the case of the still picture mode. Those still and movie images are allowed to be defined as image data files, which permit random-access data retrieval of the image data recorded on optical disk 25.

According to the invention, there is provided a digital electronic camera in which the still and movie picture modes are easily selected by means of a simplified operation of the input device. The simplified operation causes data of both still and movie images to be stored in a single data recording medium. Additionally, the disk drive device can select a drive manner suitable for an imaging device to produce still and movie pictures, and the image data read out from a frame memory is compressed suitable for the still and movie picture recordings. Image data representative of still and movie images can appropriately be recorded in a single data recording medium by a simplified operation.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A digital electronic camera comprising:
   imaging means for capturing an image of an object to be photographed and generating a corresponding electric signal;
   signal converter means for converting the electric signal into corresponding, digital image data;
   storing means for storing therein the image data:
   processor means for processing the image data stored in said storing means;
   recording means for recording the processed image data in a data recording medium; and
   input means for informing said processor means of either a first condition or a second condition when operated, the first condition defining a first operative mode, in which a still image of an object is to be recorded in the data recording medium, the second condition defining a second operative mode, in which movie images of the object are to be recorded in the data recording medium;
   said processor means comprising:
   condition detector means for determining which of the first condition or the second condition is informed by said input means;
   read-out means operative in response to said condition detector means for reading out the image data from said storing means;
   data compressing means for compressing the image data read out from said storing means;
   write-in means for providing said recording means with the compressed image data;
   mode selector means operative in response to said condition detector means for selecting either the first operative mode or the second operative mode; and
   drive means operative in response to said mode selector means for determining how to drive said imaging means;
   said data compressing means comprising;
   first compressing means operative in response to the first operative mode for compressing a frame of image data representing a still image of the object; and
   second compressing means operative in response to the second operative mode for compressing at least part of a consecutive plurality of fields or at least part of a consecutive plurality of frames of image data corresponding to movie images of the object.

2. A camera in accordance with claim 1, wherein said drive means is responsive to the first and second operative modes to generate first and second drive signals, respectively, causing said imaging means to develop the electric signal on frame and field bases, respectively;
   said read-out means being responsive to the first operative mode to read out the image data stored in said storing means, and to the second operative mode to read out consecutively part of the image data stored in said storing means in a period of time associated with the second condition informed by said input means.

3. A camera in accordance with claim 2, further comprising sensor means for sensing a movement of said camera to generate correspondingly an additional electric signal;
   said processor means further comprising:
   movement detector means operative in response to the additional electric signal for producing movement data associated with the additional electric signal; and
   correction means operative in response to the movement data and the second operative mode for producing correction data;
   said read-out means being responsive to the correction data to modify a position of the part of the image data and to read out the part of the image data in the modified position from said storing means to thereby compensate for a movement between the consecutive parts of image data read out from said storing means.

4. A camera in accordance with claim 2, wherein the second drive signal is formed to cause said imaging means to develop the electric signal on the field basis in a period of time substantially longer than a period of time in which said imaging means develops the electric signal on the frame basis.

5. A camera in accordance with claim 1, wherein said input means comprises switch means having a first stage at which said switch means informs, in operation, said processor means of the first condition, and a second stage at which said switch means informs, in operation, said processor means of the second condition.

6. A camera in accordance with claim 1, wherein said data recording medium comprises an optical disk on which data such as image data is to rewritably be recorded.

7. A digital electronic camera comprising;
an image sensor for capturing an image of an object to be photographed and generating a corresponding electric signal;
a signal converter for converting the electric signal into corresponding, digital image data;
a storage circuit for storing therein the image data;
a processor for processing the image data stored in said; storage circuit;
a recorder circuit for recording the processed image data in a data recording medium; and
an input device for informing said processor of either a first condition or a second condition when operated, the first condition defining a first operative mode in which a still image of an object is to be recorded in the data recording medium, the second condition defining a second operative mode in which movie images of the object are to be recorded in the data recording medium;
said processor comprising;
a condition detector circuit for determining which of the first condition or the second condition is informed by said input device;
a read-out circuit operative in response to said condition detector circuit for reading out the image data from said storage circuit;
a data compressing circuit for compressing the image data read out from said storage circuit;
a write-in processor circuit for providing said recorder circuit with the compressed image data;
a mode selector circuit operative in response to said condition detector circuit for selecting either the first operative mode or the second operative mode; and
a driver circuit operative in response to said mode selector circuit for determining how to drive said image sensor;
said data compressing circuit comprising;
a first compressing circuit operative in response to the first operative mode for compressing a frame of image data representing a still image of the object; and
a second compressing circuit operative in response to the second operative mode for compressing at least part of a consecutive plurality of fields or at least part of a consecutive plurality of frames of image data corresponding to movie images of the object.

8. A camera in accordance with claim 7, wherein
said driver circuit is responsive to the first and second operative modes to generate first and second drive signals, respectively, causing said image sensor to develop the electric signal on frame and field bases, respectively;
said read-out processor circuit being responsive to the first operative mode to read out the image data stored in said storage circuit, and to the second operative mode to read out consecutively part of the image data stored in said storage circuit in a period of time associated with the second condition informed by said input device.

9. A camera in accordance with claim 8, further comprising a sensor device for sensing a movement of said camera to generate correspondingly an additional electric signal;
said processor further comprising:
a movement detector circuit operative in response to the additional electric signal for producing movement data associated with the additional electric signal; and
a correction circuit operative in response to the movement data and the second operative mode for producing correction data;
said read-out processor circuit being responsive to the correction data to modify a position of the part of the image data and to read out the part of the image data in the modified position from said storage circuit to thereby compensate for a movement between the consecutive parts of image data read out from said storage circuit.

10. A camera in accordance with claim 8, wherein said input device comprises a manually operable switch having a first stage at which said switch informs, in operation, said processor of the first condition, and a second stage at which said switch informs, in operation, said processor of the second condition.

* * * * *